(12) United States Patent
Vianello et al.

(10) Patent No.: US 11,232,150 B2
(45) Date of Patent: Jan. 25, 2022

(54) SYSTEM AND METHOD FOR GEOCODING

(71) Applicant: Cape Analytics, Inc., Mountain View, CA (US)

(72) Inventors: Giacomo Vianello, Mountain View, CA (US); Matthieu Portail, Mountain View, CA (US)

(73) Assignee: Cape Analytics, Inc., Mountain View, CA (US)

( * ) Notice: Subject to any disclaimer, the term of this patent is extended or adjusted under 35 U.S.C. 154(b) by 0 days.

(21) Appl. No.: 17/228,360

(22) Filed: Apr. 12, 2021

(65) Prior Publication Data

US 2021/0319059 A1    Oct. 14, 2021

Related U.S. Application Data

(60) Provisional application No. 63/008,487, filed on Apr. 10, 2020.

(51) Int. Cl.
*G06K 9/00* (2006.01)
*G06F 16/587* (2019.01)
(Continued)

(52) U.S. Cl.
CPC ............ *G06F 16/587* (2019.01); *G06F 16/55* (2019.01); *G06N 3/04* (2013.01); *G06N 3/08* (2013.01);
(Continued)

(58) Field of Classification Search
CPC ...... G06F 16/29; G06F 16/9537; G06F 16/51; G06F 16/2455; G06F 3/04842; G06F 16/24578; G06F 16/583; G06F 16/5866; G06F 16/23; G06F 16/9554; G06K 9/00637; G06K 9/00201; G06K 9/3233;
(Continued)

(56) References Cited

U.S. PATENT DOCUMENTS 5,633,946 A   5/1997 Lachinski et al.
7,873,238 B2   1/2011 Schultz et al.
(Continued)

OTHER PUBLICATIONS

Qin Semantic Segmentation of Building Roof in Dense Environment with Deep Convolutional Neural Network: A Case Study Using GF2 VHR Imagery in China, 2019 (Year: 2019).*
(Continued)

*Primary Examiner* — Alex Kok S Liew
(74) *Attorney, Agent, or Firm* — Jeffrey Schox; Diana Lin (57) ABSTRACT

The method for determining a geographic identifier including: determining a location description; determining parcel data; determining a georeferenced image based on the location description; generating a set of image features using the georeferenced image; optionally determining a built structure class; identifying a location of interest within the georeferenced image based on the set of features; determining a geographic identifier associated with the location of interest based on the image georeference; associating the geographic identifier with the location description; optionally returning the geographic identifier in response to the location description comprising an address; and optionally returning an address in response to the location description comprising a geographic coordinates.

20 Claims, 8 Drawing Sheets

(51) Int. Cl.
*G06F 16/55* (2019.01)
*G06N 3/04* (2006.01)
*G06N 3/08* (2006.01)
*G06K 9/62* (2006.01)
*G06K 9/32* (2006.01)

(52) U.S. Cl.
CPC ....... *G06K 9/00651* (2013.01); *G06K 9/3233* (2013.01); *G06K 9/6256* (2013.01); *G06K 9/6267* (2013.01)

(58) Field of Classification Search
CPC ......... G06K 9/6292; G06K 2009/4666; G06K 9/46; G06K 9/4661; G06K 9/6215; G06K 9/6263; G06K 9/00664; G06K 9/00671; G06K 9/627; G06Q 10/06; G06Q 10/063; G06T 2207/10032; G06T 2207/30184; G06T 2207/10021; G06T 2207/10028; G06T 7/11; G06T 7/136; G06T 7/187; G06T 7/593; G06T 11/00; G06T 11/60; G06T 15/40; G06T 17/20; G06T 19/00
See application file for complete search history.

(56) References Cited

U.S. PATENT DOCUMENTS

| | | |
|---|---|---|
| 7,890,509 B1 | 2/2011 | Pearcy et al. |
| 8,078,436 B2 | 12/2011 | Pershing et al. |
| 8,081,841 B2 | 12/2011 | Schultz et al. |
| 8,085,849 B1 | 12/2011 | Ratner et al. |
| 8,145,578 B2 | 3/2012 | Pershing et al. |
| 8,170,840 B2 | 5/2012 | Pershing |
| 8,209,152 B2 | 6/2012 | Pershing |
| 8,401,222 B2 | 3/2013 | Thornberry et al. |
| 8,452,125 B2 | 5/2013 | Schultz et al. |
| 8,515,125 B2 | 8/2013 | Thornberry et al. |
| 8,531,472 B2 | 9/2013 | Freund et al. |
| 8,542,880 B2 | 9/2013 | Thornberry et al. |
| 8,660,382 B2 | 2/2014 | Schultz et al. |
| 8,670,961 B2 | 3/2014 | Pershing et al. |
| 8,731,234 B1 | 5/2014 | Ciarcia et al. |
| 8,774,525 B2 | 7/2014 | Pershing |
| 8,818,770 B2 | 8/2014 | Pershing |
| 8,823,732 B2 | 9/2014 | Adams et al. |
| 8,825,454 B2 | 9/2014 | Pershing |
| 8,977,520 B2 | 3/2015 | Stephens et al. |
| 8,995,757 B1 | 3/2015 | Ciarcia et al. |
| 9,129,376 B2 | 9/2015 | Pershing |
| 9,135,737 B2 | 9/2015 | Pershing |
| 9,141,880 B2 | 9/2015 | Ciarcia |
| 9,147,287 B2 | 9/2015 | Ciarcia |
| 9,159,164 B2 | 10/2015 | Ciarcia |
| 9,183,538 B2 | 11/2015 | Thornberry et al. |
| 9,244,589 B2 | 1/2016 | Thornberry et al. |
| 9,275,496 B2 | 3/2016 | Freund et al. |
| 9,292,913 B2 | 3/2016 | Schultz et al. |
| 9,329,749 B2 | 5/2016 | Thornberry et al. |
| 9,437,029 B2 | 9/2016 | Schultz et al. |
| 9,514,568 B2 | 12/2016 | Pershing et al. |
| 9,520,000 B2 | 12/2016 | Freund et al. |
| 9,542,738 B2 | 1/2017 | Schultz et al. |
| 9,599,466 B2 | 3/2017 | Pershing |
| 9,743,046 B2 | 8/2017 | Giuffrida et al. |
| 9,753,950 B2 | 9/2017 | Schultz et al. |
| 9,805,489 B2 | 10/2017 | Schultz et al. |
| 9,836,882 B2 | 12/2017 | Freund et al. |
| 9,911,228 B2 | 3/2018 | Pershing et al. |
| 9,933,254 B2 | 4/2018 | Thornberry et al. |
| 9,933,257 B2 | 4/2018 | Pershing |
| 9,959,581 B2 | 5/2018 | Pershing |
| 9,959,653 B2 | 5/2018 | Schultz et al. |
| 9,972,126 B2 | 5/2018 | Freund et al. |
| 10,197,391 B2 | 2/2019 | Thornberry et al. |
| 10,229,532 B2 | 3/2019 | Freund et al. |
| 10,338,222 B2 | 7/2019 | Schultz et al. |
| 10,346,935 B2 | 7/2019 | Thornberry et al. |
| 10,402,676 B2 | 9/2019 | Wang et al. |
| 10,455,197 B2 | 10/2019 | Giuffrida et al. |
| 10,489,953 B2 | 11/2019 | Schultz et al. |
| 10,503,843 B2 | 12/2019 | Keane |
| 10,515,414 B2 | 12/2019 | Pershing |
| 10,528,960 B2 | 1/2020 | Pershing et al. |
| 10,529,029 B2 | 1/2020 | Okazaki |
| 10,571,575 B2 | 2/2020 | Schultz et al. |
| 10,573,069 B2 | 2/2020 | Freund et al. |
| 10,648,800 B2 | 5/2020 | Thornberry et al. |
| 10,650,285 B1 | 5/2020 | Okazaki |
| 10,663,294 B2 | 5/2020 | Pershing et al. |
| 10,685,149 B2 | 6/2020 | Pershing |
| 10,796,189 B2 | 10/2020 | Wang et al. |
| 10,839,469 B2 | 11/2020 | Pershing |
| 2004/0138817 A1* | 7/2004 | Zoken ................ G01C 21/32 |
| | | 702/5 |
| 2005/0209781 A1 | 9/2005 | Anderson |
| 2006/0041375 A1 | 2/2006 | Witmer et al. |
| 2009/0222438 A1 | 9/2009 | Strandell et al. |
| 2009/0296990 A1* | 12/2009 | Holland ................ G06T 7/60 |
| | | 382/106 |
| 2010/0114537 A1 | 5/2010 | Pershing |
| 2012/0041722 A1 | 2/2012 | Quan et al. |
| 2014/0094194 A1 | 4/2014 | Schwent et al. |
| 2015/0022555 A1* | 1/2015 | Chau .................. G09G 5/377 |
| | | 345/635 |
| 2017/0076438 A1 | 3/2017 | Kottenstette et al. |
| 2019/0188516 A1 | 6/2019 | Porter et al. |
| 2020/0134833 A1 | 4/2020 | Biswas et al. |
| 2020/0160030 A1 | 5/2020 | Lavi |
| 2021/0073449 A1 | 3/2021 | Segev et al. |

OTHER PUBLICATIONS

Jaeeun Lee, Machine Learning Classification of Buildings for Map Generalization, ISPRS Int. J. Geo-Inf. 2017, 6, 309; doi:10.3390/ijgi6100309.
https://capeanalytics.com/commercial-property-identification/.
https://github.com/microsoft/USBuildingFootprints.
Weijia Li et al. "Semantic Segmentation-Based Building Footprint Extraction Using Very High-Resolution Satellite Images and Multi-Source GIS Data", Remote Sens. 2019, 11, 403; doi:10.3390/rs11040403.

* cited by examiner

SYSTEM AND METHOD FOR GEOCODING

CROSS-REFERENCE TO RELATED APPLICATIONS

This application claims the benefit of U.S. Provisional Application Ser. No. 63/008,487, filed on 10 Apr. 2020, which is incorporated in its entirety by this reference.

TECHNICAL FIELD

This technology relates generally to the location identification field, and more specifically to a new and useful method and system for geocoding.

BACKGROUND

Businesses oftentimes require accurate, up-to-date geocoding, such as for delivery applications, navigation applications, map placement, property intelligence, and map marker placement. Conventional geocoding systems fail to offer this quality of geocoding and fall into two general buckets: geocoding systems that rely on ground-truth data collected by harvesting GPS-accurate locations of primary buildings, and geocoding systems that infer the address-geolocation association by estimation or interpolation. The former systems are expensive and difficult to scale, due to the amount of labor required to collect the data; and are easily outdated due to continual physical building changes (e.g., new construction, demolitions, subdivisions, etc.). The latter systems tend to be inaccurate, and do not reliably associate an address with the correct building, particularly when multiple buildings are on the parcel.

Thus, there is a need in the geocoding field to create a new and useful system and method for geocoding. This technology provides such new and useful system and method.

DESCRIPTION OF THE PREFERRED EMBODIMENTS

The following description of the preferred embodiments of the technology is not intended to limit the technology to these preferred embodiments, but rather to enable any person skilled in the art to make and use this technology.

1. Overview

Figure 1:
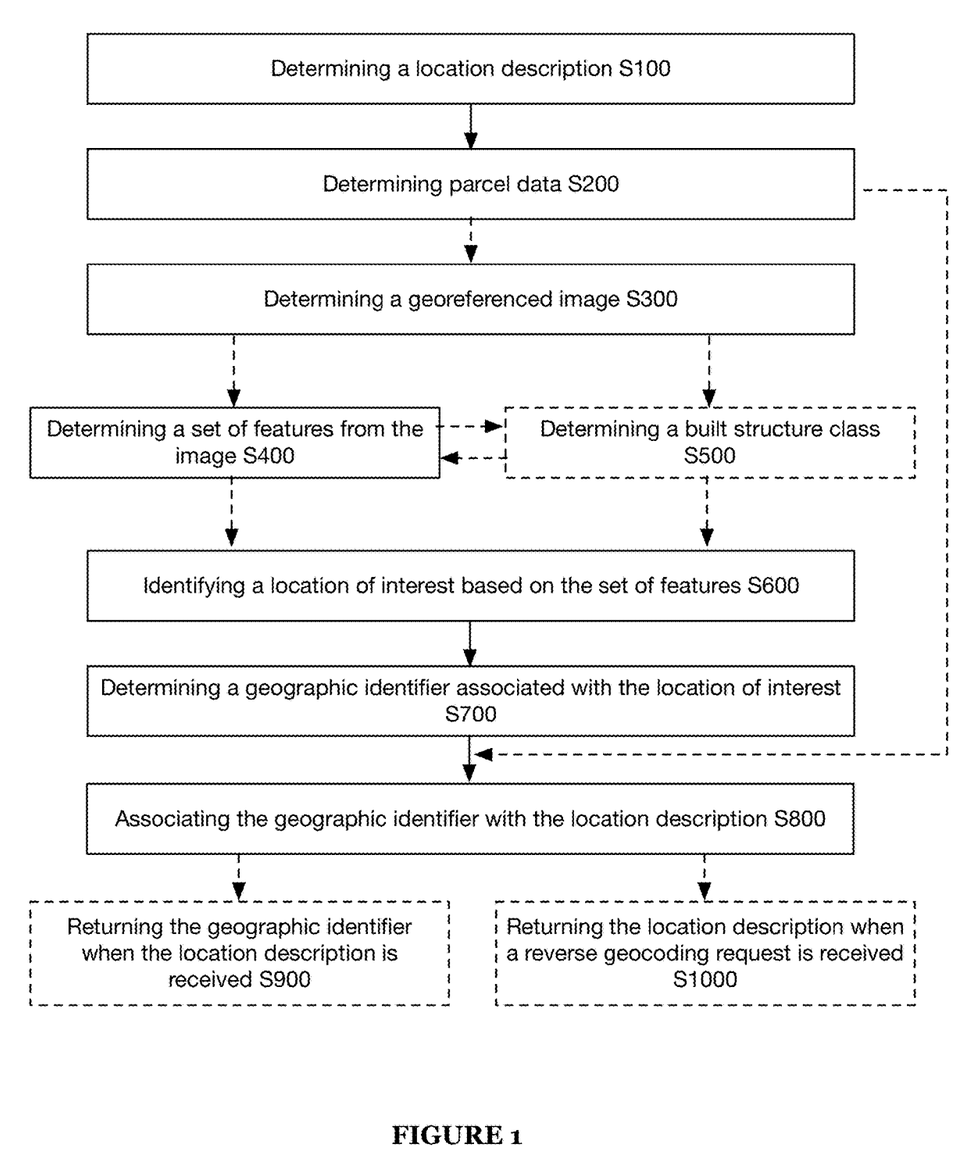
FIG. 1 is a schematic representation of the method.

As shown in FIG. 1, a method for determining a geographic identifier can include: determining a location description S100; determining parcel data S200; determining a georeferenced image S300; determining a set of image features from the georeferenced image S400; optionally determining a set of built structure classes for the set of image features S500; identifying a location of interest within the georeferenced image based on the set of features S600; determining a geographic identifier associated with the location of interest S700; associating the geographic identifier with the location description S800; optionally returning the geographic identifier S900; and optionally returning the location description S100. However, the method can include other processes.

The method functions to determine the geocode (e.g., geographic identifier, geographic coordinates, etc.) for a geographic identity (e.g., location, object, built structure, etc.) that is also identifiable by a location description. This can enable geocoding and/or reverse geocoding.

The resultant geocode can be used in: real estate analysis (e.g., identifying the correct building on a parcel), vehicle navigation (e.g., for aerial vehicles, terrestrial vehicles, etc.), mapping, and/or otherwise used in other applications.

Figure 2:
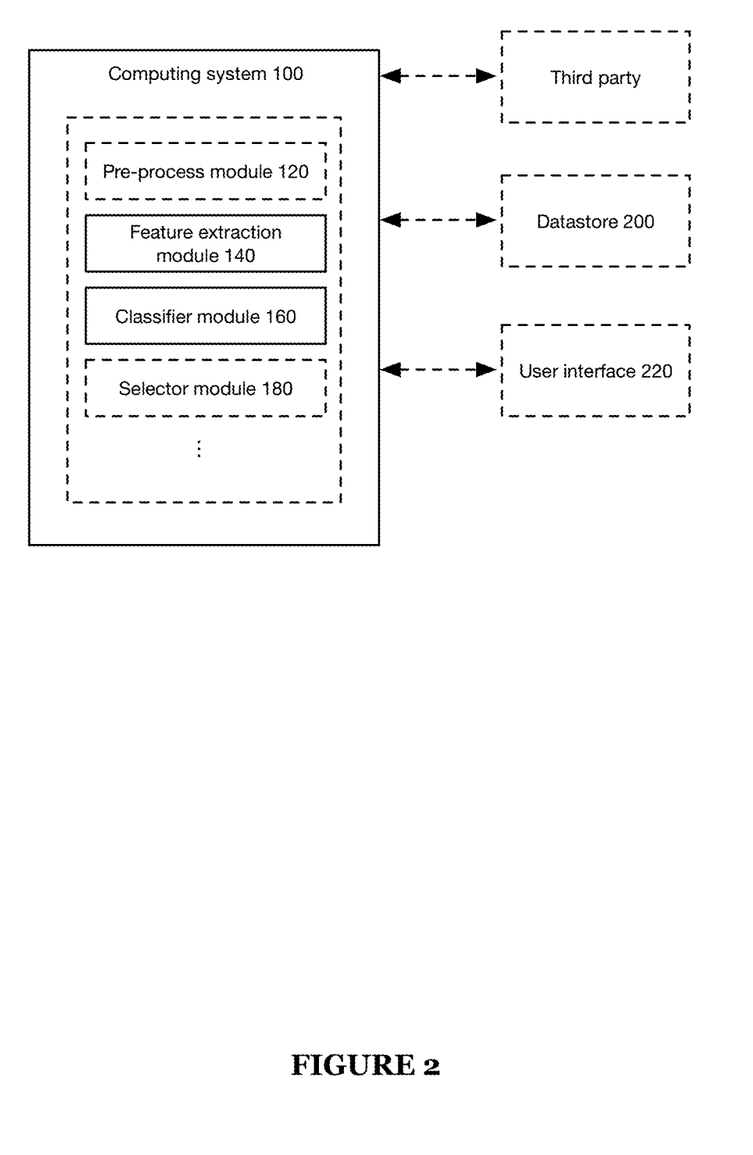
FIG. 2 is a schematic representation of the system.

As shown in FIG. 2, a system 20 for geocoding includes one or more computing systems 100, one or more modules, optionally one or more datastores 200, one or more user interfaces 220, and/or any other suitable components.

2. Examples

In a first example, the method for determining a geographic identifier includes: determining a georeferenced image depicting a parcel associated with a location description; determining an image feature, associated with a built structure class, from the image; identifying a location of interest (e.g., point) within the image based on the image feature; determining a geographic identifier associated with the location of interest based on the image's georeference; and associating the geographic identifier with the location description, wherein the geographic identifier is returned when a request with the location description is received.

Figure 3A:
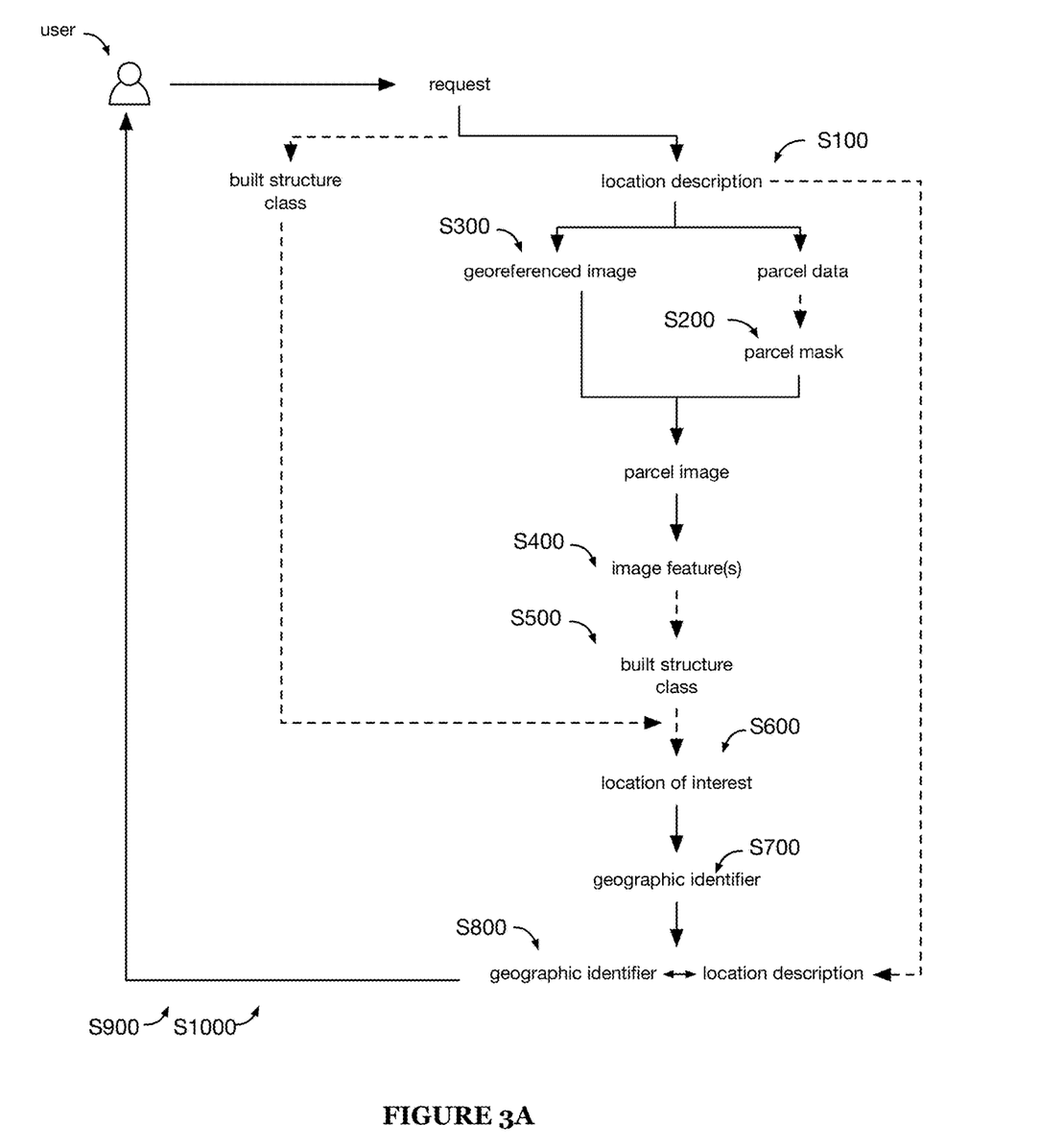
FIGS. 3A-B depict embodiments of the method.
Figure 3B:
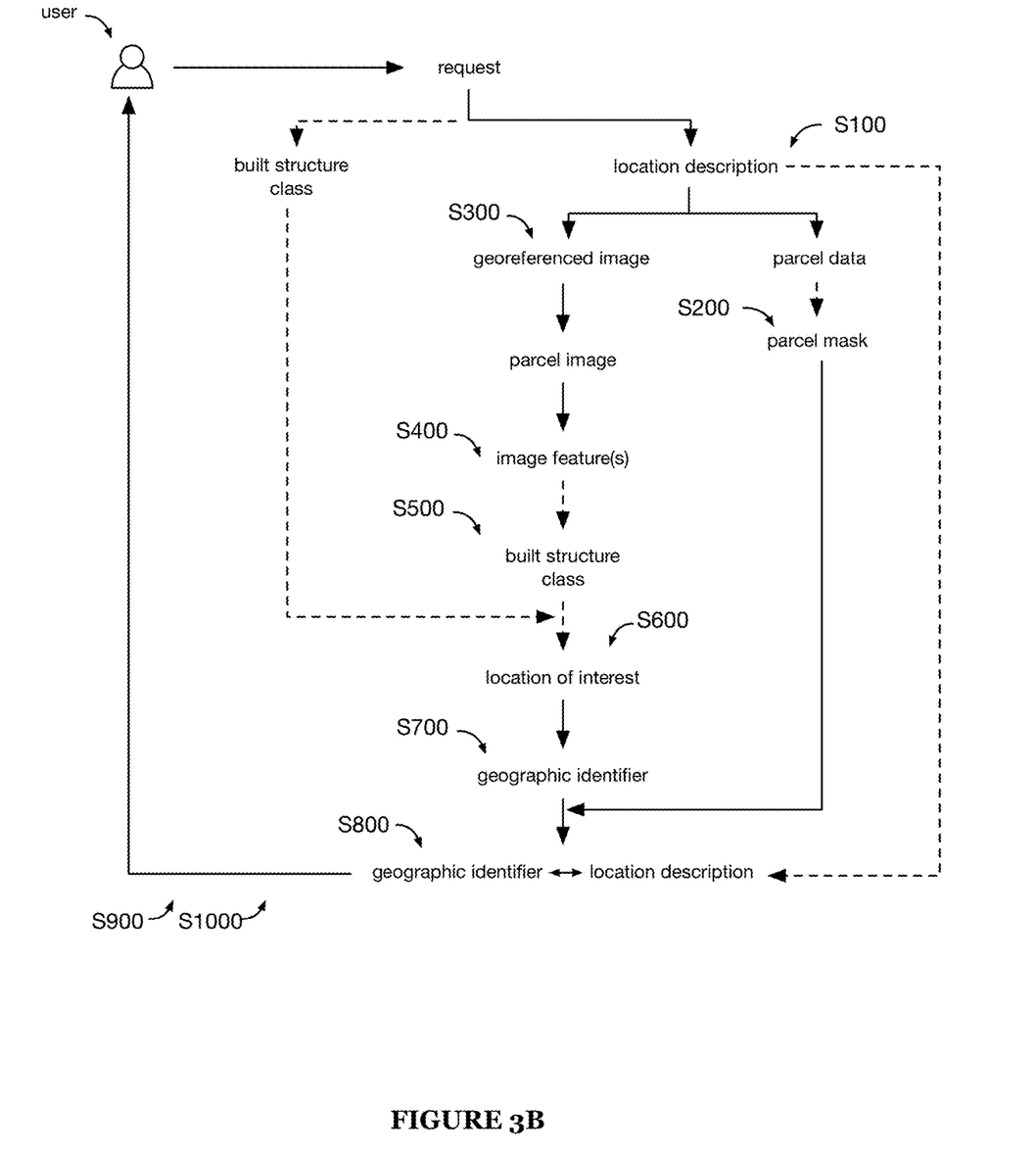
Figure 4:
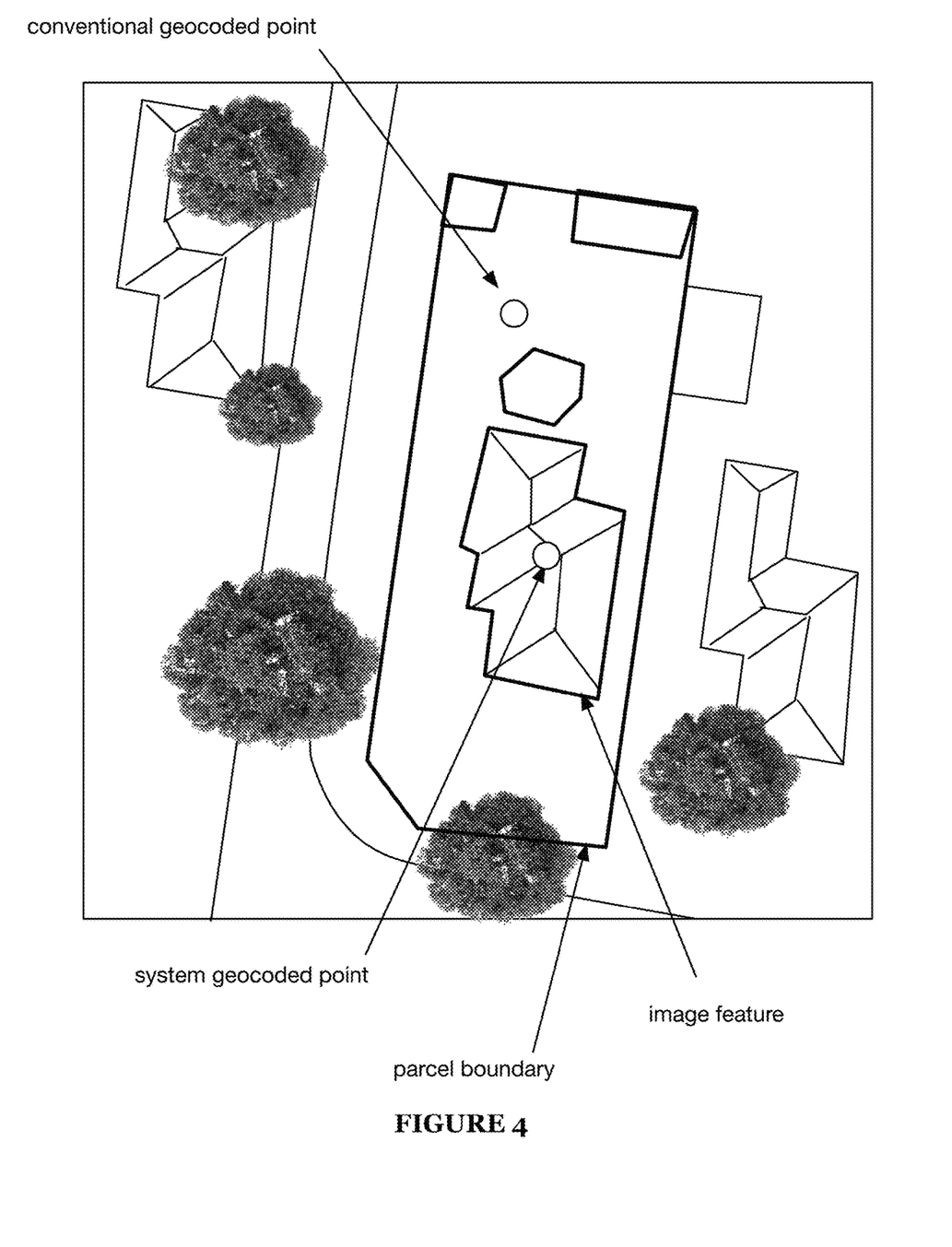
FIG. 4 is an example of the geolocation determined by the method.

In an specific example (shown in FIGS. 3A-B), the method can include: determining a georeferenced image associated with a location descriptions; segmenting the georeferenced image into a set of image segments; optionally selecting an image segment (e.g., based on a predetermined class, requested class, class associated with the location description, etc.); identifying a geometric feature (e.g., centroid) of the image segment; determining a geographic identifier (e.g., geographic coordinates) for the geometric feature; and associating the geographic identifier with the location description. The geographic identifier can be returned when a geocoding request including a location description (e.g., address, location, etc.) is received. Determining the georeferenced image can include: determining a region image associated with the location description (e.g., associated with or encompassing the parcel associated with the location description); determining a parcel mask associated with location description (e.g., associated with the address, from county records, etc.); and masking the region image with the parcel mask to determine a parcel image, which is used as the georeferenced image. Alternatively, the regional image can be used as the georeferenced image, wherein the image segments (belonging to multiple parcels in this variant) can be filtered using the parcel mask after segmentation. The request can be received as a user input (e.g., text input address), an API request, and/or any other suitable query, and the response can be returned as an API response, a visual graphic, and/or any other suitable response.

In an illustrative example, the system and/or method receives a text address, such as "412 Matadero Ave, Palo Alto, Calif." and the system and/or method determines a longitude and latitude associated with a physical building on a parcel identified by the text address, such as a longitude of −122.133004 and a latitude of 37.420174.

In variants, the method can also enable reverse geocoding, wherein the method converts geographic coordinates to an address. For example, the method can: store geographic identifiers (e.g., geographic coordinates) associated with the image segment(s) extracted from the georeferenced image in association with the location description; and return the location description when a reverse geocoding request (e.g., identifying a geographic identifier of the image segment(s)) is received. Attributes of the image segment (e.g., built structure class, built structure subclass, condition, geometries, centroid, geocode, etc.) can optionally be returned.

3. Benefits

The system and method confer several benefits over conventional systems.

First, variants of the system and method avoid expensive data collection techniques, such as driving vehicles through municipalities to collect location data (e.g., imagery data, global position system (GPS) data), and/or buying expensive datasets. Instead, the system and method enable scalable geocoding by using satellite, aerial, and/or drone imagery.

Second, variants of the system and method can return up-to-date results by using recent imagery for every request (e.g., most recent imagery; imagery collected within the last day, the last week, within the last month, within the last 3-6 months, etc.).

Third, variants of the system and method enable more accurate geocoding than conventional systems by using parcel data to identify the built structure to geocode. For example, the method can select an image region for analysis, then determine the specific physical building that the address should map to. Further variants enable even more accurate geocoding by selecting the physical building based on the respective class, which can enable geocoding to the specific building that is queried for.

4. System

The system for geocoding can include: one or more computing systems 100, one or more modules, optionally one or more datastores 200, one or more user interfaces 220, and/or any other suitable components. The system can be used with one or more images, parcel data, and/or any other suitable elements.

The one or more computing systems 100 can function to process a request and determine a geographic identifier for the request. The computing system can include one or more remote computing systems (e.g., network-connected servers), one or more user devices, and/or any other suitable computing systems. In some embodiments, the computing system can include a remote computing system and a user device that interfaces with the remote computing system via an API.

The system preferably includes one or more modules. The modules can include an optional pre-process module, a parcel module, a feature extraction module, an optional classifier module, an optional selector module, and/or any other suitable module. The processes of the one or more modules can be performed by the computing system or component thereof. For example, the pre-process, feature extraction, classifier, and selector modules can be executed at the remote computing system and the output of the selector module can be presented on the user interface. The output of each module can be stored in the datastore and/or discarded. The system can additionally or alternatively include any other suitable module that provides any other suitable functionality.

The modules can each include: one or more machine learning algorithms (e.g., regression models, classifiers, neural networks, etc.), rulesets, heuristics, lookup tables, API interfaces, and/or other models. The algorithms can be supervised and/or unsupervised. The algorithms can include natural language processing algorithms, feed forward neural networks, convolutional neural nets, RNNs, transformer networks, encoder networks, and/or any other suitable algorithms. The algorithms can be pre-trained and/or not pre-trained. The algorithms can process input bidirectionally (e.g., consider the context from both sides, such as left and right, of a word), unidirectionally (e.g., consider context from the left of a word), and/or otherwise process inputs.

The pre-process module 120 can function to determine a georeferenced image based on a request (e.g., region image, parcel mask, text input, etc.).

The pre-process module can be used with text embeddings which can include rule sets (e.g., to determine address elements such as street number, street name, city, zip code, etc.) and/or any other suitable embedding.

The feature extraction module 140 can function to determine image features for an image (e.g., georeferenced image) that represent building geometry. The feature extraction module can be: a semantic segmentation module, an instance-based semantic segmentation module, a segmentation module paired with a classifier, or be any other suitable model. In the last variant, the feature extraction module can be integrated with the classifier module (e.g., the same algorithm can determine both the image features and the built structure class) or the feature extraction module can separate from the classifier module.

Each image feature determined by the feature extraction module can represent one or more buildings, independent buildings, or other property features (e.g., within the parcel, within the image, etc.). An image feature can include: image segments (e.g., foreground segments; semantic segments associated with a single class; semantic segments for multiple classes; etc.), a set of points, a set of edges (e.g., feature edges), a set of corners, a mask, a segment boundary, a polygon boundary (e.g., bounding box, bounding triangle, bounding pentagon, closed loop, etc.), a multi-polygon, and/or other representation. Each image feature can be associated with one or more labels. The labels can represent: a built structure class, a built structure subclass, and/or other information.

In a first variation, the feature extraction module can determine building boundaries (e.g., primary building, secondary building, etc.), and/or property feature boundaries (e.g., swimming pool, trampoline, fire pit, beach front, etc.). In a second variation, the feature extraction module can determine building or feature masks (e.g., by labelling each pixel with a class or non-class label).

The feature extraction module can include: a semantic segmentation module (e.g., trained semantic segmentation model), which functions to associate each pixel in an image with a label, wherein objects of the same class can be treated as a single entity (e.g., all pixels with a building label are treated as a building entity); an object detector module, which functions to generate a bounding polygon for each physical building depicted in the georeferenced image; an instance segmentation module, which functions to associate each pixel in an image with a label, wherein objects of the same class are associated with distinct labels (e.g., pixels are segmented based on the distinct building that the pixel depicts); and/or any other suitable segmentation module.

In embodiments where the class label is determined per pixel, the pixels on the boundaries of an object (e.g., where the label changes classes) can correspond to a group and/or cluster of pixels, which represent the object segment.

The feature extraction module can include segmentation modules employing one or more segmentation techniques including: multi-scale techniques, thresholding techniques, edge detection-based techniques, region-based techniques, clustering based techniques, watershed-based techniques, partial differential equation based and artificial neural network based techniques, and/or any other suitable techniques.

The feature extraction module can include segmentation modules employing one or more machine learning algorithms including: clustering algorithms (e.g., connectivity-based; centroid-based clustering, such as k-means clustering; distribution-based clustering; density-based clustering; grid-based clustering; neural clustering, graph-based clustering, group clustering; and/or any other suitable clustering algorithm); trained neural networks (e.g., CNN, encoder networks, decoder networks, transformers, neural networks including dense blocks, such as including several layers of convolutions where the feature-maps of one or more preceding layers are used as inputs for one or more subsequent layers; and/or any other suitable combination of the aforementioned networks), conditional random fields (CRF), rulesets (e.g., gray level segmentation), and/or any other suitable algorithm. The one or more algorithms can be combined, such as CNN-CRF methods, chained, and/or otherwise used. The algorithms can be supervised and/or unsupervised. The algorithms can include reinforcement learning techniques. The algorithms can be edge based, region based, and/or otherwise based. The algorithms can be performed in real-time and/or offline. The algorithms can additionally or alternatively include any other suitable characteristics.

The optional classifier module 160 can function to determine a class of one or more image features (or set thereof) determined by the feature extraction module. The classifier module can determine the class based on the image feature, based on the image feature and surrounding pixels (e.g., based on the parcel image, based on the image portion within a bounding box surrounding the image feature, etc.), based on the georeferenced image, based on auxiliary information associated with the feature (e.g., based on depth or height information, etc.), and/or based on any other suitable information. The classifier module can receive an image feature from the feature extraction module, the datastore, and/or from any other suitable module.

The classifier module is preferably separate from the feature extraction module, but can additionally or alternatively be part of the feature extraction module (e.g., one or more layers in a segmentation network). When the classifier module is separate, the classifier module can be selectively executed (e.g., upon satisfaction of a set of execution conditions, such as the number of image features exceeding a threshold number), always executed, or otherwise executed.

The classifier module can include supervised classifiers, unsupervised classifiers, semi-supervised classifiers, and/or any other suitable classier.

The classifier module can include a binary classifier (e.g., that determines whether the building is a given class, such as primary building or not primary building), multi-class classifier (e.g., primary building, secondary building, first property feature, second property feature, etc.), any other suitable classifier.

The classifier module can include one or more machine learning algorithms including: regression (e.g., logistic regression, linear regression, etc.), SVM, Bayesian networks, neural networks (e.g., feed forward, CNN, RNN, transformers, etc.), clustering algorithms (e.g., similar to those described for the feature extraction module, alternatively different clustering methods), and/or other methods. The classifier module can additionally or alternatively include rules, heuristics, and/or other methods. The algorithms can be combined, chained, and/or related in any other suitable manner.

In some embodiments, each class determined for an image feature can additionally be associated with a confidence score (e.g., determined by the algorithm).

The selector module 180 can function to identify a location of interest within a set of image features. The location of interest is preferably a geometric feature of an image feature (e.g., a boundary point, a centroid, etc.); but can alternatively be an image feature; a location determined based on multiple image features (e.g., a centroid between image features); and/or be otherwise defined. The selector module preferably determines the location of interest based on identification criteria, which can include: rule sets, equations, and/or other algorithms. The selector module can optionally select identification criteria, such as which rule set and/or algorithm to use; determine what built structure class to select; and/or determine any other suitable selection criteria.

The selector module preferably receives a set of segments, and can optionally receive assigned classes as inputs (e.g., each segment is assigned a class). The input can be received from the feature extraction module, the classifier module, the datastore, and/or any other suitable element.

The selector module can include: one or more rulesets, one or more machine learning algorithms (e.g., neural networks; regressions, such as logistic, linear, etc.; Bayesian networks; clustering techniques; etc.), a set of heuristics, and/or any other suitable elements for determining a building based on selection criteria.

The datastore 200 can function to store data, imagery, updated imagery, and/or any other suitable information. The data can include: addresses, parcel data (e.g., parcel polygons, parcel images, building descriptions, expected built structure classes, expected building number, etc.), image features, built structure class labels (e.g., per segment, per parcel image, per parcel polygon, etc.), building geolocation, imagery (with geographic identifiers), and/or any other suitable data.

The imagery and/or updated imagery can be retrieved from a third-party using an API request, bulk download, streaming service, and/or retrieved using any other suitable process.

The datastore can pull data from a third-party periodically (e.g., 1 day, 1 week, 1 month, 6 months, 1 year).

The datastore can be used by the one or more modules to retrieve information and/or used as a look up table.

The system can optionally include a user interface 220, which functions to present the geographic identifier or other geocoded output (e.g., primary building centroid) to the user. Additionally or alternatively, the user interface can be an application (e.g., native, browser, etc.) associated with an API, or be any other suitable interface.

However, the system can additionally or alternatively include any other suitable elements.

The system can be used with one or more images. The images are preferably remote imagery (e.g., satellite imagery, aerial imagery, drone imagery, etc.), collected for a geographic region, or other imagery. The images can depict a large-geographic-extent that encompass one or more regions, such as parcels. The images are preferably topdown plan views of the region, but can additionally or alternatively include elevation views (e.g., street view imagery), orthographic views, and/or other views. The images are preferably 2D, but can alternatively be 3D (e.g., height maps, point clouds, depth maps), be associated with depth, terrain, or other data. The image can be red-green-blue (RGB), hyperspectral, multispectral (MS), radar, black and white, infrared (IR), near-infrared (NIR), ultraviolet (UV), and/or captured using any other suitable wavelength. The image can optionally be captured using radar, sonar, LIDAR, time-of-flight, and/or other remote sampling modalities. The images can additionally or alternatively include any other suitable characteristics.

The images can include region images, parcel images, physical building images, and/or images of any other suitable geographic extent. The region images can encompass one or more parcels, and can include full or partial imagery frames (e.g., as received from the imagery providers). A parcel image preferably encompasses a single parcel (e.g., determined based on or matching a parcel polygon), but can alternatively encompass multiple parcels or a portion of a parcel. The parcel image is preferably a segment of an image, but can additionally or alternatively be the full image. A building image can include an image segment corresponding to a physical image feature. However, other images or image segments can be determined.

The images can be georeferenced images (e.g., associated with geographic data). The images are preferably associated with a georeference (e.g., georeferencing; transformation matrix; coordinate transform; etc.), which relates the image coordinate system with an external geographic coordinate system. The images are preferably pixel-aligned with geographic coordinates, but can be offset, aligned within a threshold margin of error, or otherwise aligned. Examples of geographic data can include: a geolocation (e.g., geolocation of an image centroid, such as geographic coordinates; of an image feature centroid; of one or more image features contained within the extent of the image; of a pixel or geometric point associated with the image features; etc.); a geographic extent (e.g., area, range of geographic coordinates, etc.); municipal labels (e.g., set of addresses, a set of parcel identifiers or assessor parcel numbers (APN), counties, neighborhoods, cities, etc.); and/or other geographic data. The images can additionally or alternatively be associated with time data (e.g., recurrent time, unique timestamp); and/or other data. The parcel module functions to determine parcel data. The system can be used with parcel data representative of a parcel. A parcel can be: a land parcel, cadastral parcel, extent of real property, land lot, tract, and/or other geographic region. The parcel data can include: parcel boundaries, parcel masks, parcel images, building descriptions (e.g., construction, square footage, roof type, general location on the parcel, general shape, etc.), number of buildings, expected building labels, parcel description, location descriptions associated with the parcel (e.g., addresses, business names, building names, etc.), geographic identifiers associated with the parcel (e.g., the geocode for a building on the parcel, a confidence level for said geocode, etc.), and/or other parcel data. The parcel module can retrieve the parcel data, infer the parcel data (e.g., determined from an image using an ML model trained to identify parcels), and/or otherwise determine the parcel data. The parcel module can determine the parcel data from: one or more third parties (e.g., via an API request, such as from Open Street Map™, etc.); a database (e.g., local database, proprietary database, government database, etc.), and/or any other suitable source. The parcel data can be extracted from county records, permits, assessors, real estate information, and/or collected from any other suitable data source.

The parcel module can optionally verify parcel data. For example, the parcel module can retrieve one or more parcels for each address, and treat the most returned parcel (and/or parcel with the highest confidence score) as the parcel to use. In another example, the parcel module can retrieve the geocode for a location description (e.g., address), and skip the geocoding process if the returned geocode is associated with above a threshold confidence score. However, the parcel module can be otherwise used.

However, the system can be used with any other suitable elements.

5. Method

The method can include: determining a location description S100; determining parcel data S200; determining a georeferenced image S300; determining a set of image features from the georeferenced image S400; optionally determining a set of built structure classes for the set of image features S500; identifying a location of interest within the georeferenced image based on the set of features S600; determining a geographic identifier associated with the location of interest S700; associating the geographic identifier with the location description S800; optionally returning the geographic identifier S900; optionally returning the location description S1000; and/or any other suitable elements.

The method functions to determine a set of geographic coordinates corresponding to a received address (geocode). In variants, the method functions to convert the address into geographic coordinates associated with a specific physical building (built structure). All data and/or information (and/or a subset thereof) determined by the method processes can be stored in the datastore. All data and/or information (or a subset thereof) used by the method processes can be retrieved from the datastore. Alternatively, the method can receive the address and determine the geographic coordinates on the fly (e.g., not using a datastore).

The method can be performed by the system discussed above and/or any other suitable system. One or more instances of the method can be concurrently or serially performed for one or more geocoding requests.

The method can be performed: in real time, in response to receipt of a request, asynchronously from the request (e.g. before the request is received), and/or at any other suitable time. The method can be concurrently performed for: one or more location descriptors, one or more parcels, one or more buildings, and/or other otherwise performed.

In a first variant, the method is performed in response to receipt of a geocoding request (e.g., in real- or near-real time; each time an address and/or parcel is received as input to the method and/or system; etc.). This can ensure that updated data (e.g., updated within the last day, week, month, 6 months, year, etc.) is analyzed for each request to determine an accurate response to the request. In a second variant, the method is performed when updated imagery is available for the region (otherwise use previously-determined building geolocation). In a third variant, portions of method can be performed before geocoding request receipt, wherein the predetermined results are returned in response to the geocoding request. In a first embodiment of the third variant, the method executes one time per address and/or parcel wherein the output of the method can be stored in the datastore for retrieval in subsequent requests. In a second embodiment of the third variant, the method executes periodically per address and/or parcel request. For example, the system and/or method can store the output in the datastore and retrieve the output for subsequent requests in a predetermined period. After the pre-determined period, the system and/or method can re-determine and/or verify the stored output is correct and/or relevant. However, the method can be performed at any other suitable time.

Determining a location description S100 can function to determine the location description that the geographic coordinates should be determined for. The location description can include an address, a location name, geographic coordinates, and/or any other suitable information. The location description can be text-based, an encoding, and/or any other suitable representation. The location description can include: text, images, information (e.g., parcel polygons, multiple parcel polygons, etc.), and/or other data. The text can include: business names, an address, an approximate longitude and latitude, a text description of the location of the parcel, a desired built structure class (e.g., shed, garage, primary building, accessory dwelling unit (ADU), secondary housing building, etc.), and/or any other suitable text input. The location description can be determined in response to receipt of a geocoding request, in response to a detected update (e.g., image update, parcel mask update, etc.), after a predetermined period (e.g., to verify the pre-determined output stored in the datastore corresponding to the location description), and/or performed at any other suitable time. The location description can be received as part of a geocoding request, retrieved from a database, automatically generated (e.g., to update a particular geographic identifier), and/or otherwise generated.

However, the location description can be otherwise determined.

Determining parcel data S200 can function to determine information used to associate image features with the location description(s) of the parcel. The parcel data can be retrieved after S100, before S200, concurrently with S200, before S300, concurrently with S300, and/or determined at any other suitable time. The parcel data can be retrieved from the datastore, retrieved from a third-party (e.g., via an API request), retrieved from county records, and/or otherwise retrieved. Alternatively, the parcel data can be inferred using a machine learning algorithm (e.g., a trained neural network, such as a CNN, feed forward network, transformer, etc.; a clustering algorithm, etc.), and/or otherwise determined. The parcel data preferably defines the geographic region associated with the parcel with a parcel mask, but can include any other suitable information. The parcel mask can define the boundary of the parcel and/or define other parcel parameters. A parcel mask can include: a binary mask wherein parcels are represented by a 1 and community land (e.g., roads, parks, etc.) are represented by a 0; a geofence (e.g., georeferenced polygon; set of ordered geographic points; virtual boundary of the parcel; etc.); and/or include any other suitable data building. The parcel mask is preferably georeferenced (e.g., aligned with an external geographic coordinate system), but can additionally or alternatively be referenced to the image (e.g., the image coordinates). The parcel mask can be: automatically extracted from municipal records (e.g., from arcgis, assessor databases, etc.), manually determined, or otherwise determined. The parcel mask can be used to filter a region image to generate a georeferenced image for S300; filter the set of image features to generate georeferenced image features; and/or be otherwise used.

However, the parcel mask can be otherwise determined.

Determining a georeferenced image S300 can function to determine an image depicting a region of interest for building identification and analysis. The georeferenced image can be associated with an internal coordinate system and a known relationship to a global coordinate system (e.g., Earth coordinate system). The georeferenced image can be determined based on the location description, and/or other geographic information such as based on: a geographic coordinate (e.g., determined using conventional geocoding methods), a parcel identifier, a municipal identifier (e.g., determined based on the ZIP, ZIP+4, city, state, etc.), and/or other information. The georeferenced image can be retrieved (e.g., from the datastore; from a third-party datastore, such as using a third-party API; etc.); received (e.g., as part of the location description); predetermined (e.g., in response to new region image receipt, at a predetermined frequency, etc.), and pre-associated with: a parcel identifier (PID), an APN, the addresses (e.g., associated with the parcel identifier, as determined from county records), and/or other parcel information; and/or otherwise determined. The georeferenced image can be 2D, 3D, and/or any other suitable image. When the georeferenced image is 3D, the z-axis data input can include: spatial dimension data, spectral dimension data, a combination thereof, and/or any other suitable elevation data. The spatial dimension data can include: 2D data, such as plan views or elevation views; 3D data, such as point clouds, meshes, or geometric models; and/or other spatial dimension data. Spectral dimension data can include images sampled using one or more of the spectral wavelengths discussed above.

Determining the georeferenced image can include matching the location description and/or other geographic information to a region; retrieving a georeferenced image of the region; and/or any other suitable elements.

In a first variation, the georeferenced image encompasses a large geographic extent. In this variation, the georeferenced image can depict multiple parcels, geographic regions associated with multiple location descriptions, and/or other geographic regions. In this variation, the georeferenced image can be retrieved from a database, received from a third party (e.g., aerial image provider), and/or otherwise determined.

In a second variation, the georeferenced image encompasses and depicts a single parcel or portion thereof. In this variation, the georeferenced image can be determined by: determining a regional image (e.g., large geographic extent image) encompassing a parcel of interest, and filtering the regional image using the parcel mask from S200 to isolate the pixels associated with the parcel of interest from the regional image.

Filtering an image to generate a georeferenced image can include: aligning the parcel mask with a regional image (e.g., based on the respective geographic identifiers), and masking, segmenting, cutting, or otherwise isolating the region image with the parcel mask to obtain the georeferenced image (e.g., parcel image).

This variant can optionally include georeferencing the parcel image. The parcel image's georeference can be determined from the georeference of the regional image (e.g., inherited from the regional image; calculated based on the regional image's georeference and the parcel image's location within the regional image; etc.); determined based on landmarks with known geographic locations identified in the parcel image; or otherwise determined. However, the georeferenced image can be otherwise determined.

Determining a set of image features from the georeferenced image S400 can function to determine one or more structures in the georeferenced image. The image features can be generated using the feature extraction module, retrieved from a third-party datastore, and/or otherwise determined. The set of features can be determined using the georeferenced image from S300 (e.g., a 2D image, 3D image, etc.), the parcel mask from S200, auxiliary information (e.g., depth information), and/or any other information. The set of image features can be represented by: a set of masks (e.g., binary mask; likelihood mask with values between 0-1; etc.); a set of boundaries (e.g., a set of vectors); one or more polygons (e.g., bounding box, bounding triangle, bounding pentagon, any other bounding shape or blob, etc.); a set of geographic points; a set of edges, a set of corners, or otherwise represented.

In a first variant, S400 includes semantically segmenting and/or applying instance-based segmentation to the georeferenced image. This variant can generate semantic segments (e.g., for a given class) as image features. In a first example, S400 can determine image segments associated with a built structure class (e.g., a single built structure class or binary label; a plurality of built structure classes or multiclass label). In a second example, S400 can determine foreground image segments.

In a second variant, S400 includes extracting computer vision features from the georeferenced image.

In a third variant, S400 includes detecting the built structures within the georeferenced image using object detection methods, wherein the image features can include bounding boxes around the detected built structure.

In a fourth variant, when the georeferenced image includes occluded structures (e.g., occluded by vegetation, other structures, etc.), S400 can include inferring image features (e.g., building boundaries, building image segments, etc.). Image features can be inferred using multiple images of the same region or parcel captured at different times of the year or the same time of the year; from different perspectives or from the same perspective; and/or any other suitable images. Image features can be inferred using rulesets (e.g., connecting vertical lines, creating corners, etc.), human labelers, algorithms (e.g., the feature extraction module can receive as input a series of images of the same parcel to infer the building boundaries, parcel boundaries, property feature boundaries, etc.), and/or otherwise determined.

In a fifth variant, S400 includes retrieving the set of features from a third-party data source. Retrieving the set of features can include: sending a query to a third-party data source and receiving built structures and/or other features in response. The query can include: parcel data (e.g., parcel polygon, parcel identifier), the extent of the geographic coverage of the image, a geographic reference (e.g., geofence, geolocation, etc.), and/or other information.

However, the image features can be otherwise determined.

Determining a set of built structure classes for the set of image features S500 can function to determine one or more built structure classes for an image and/or the set of image features. S500 can optionally determine the number of buildings on a parcel and/or in a region, and/or provide any other suitable functionality. The built structure class can be determined after S400, contemporaneously with S400, before S400, in response to multiple building determination (e.g., multiple image features), and/or at any other suitable time. The built structure class can be determined by the classifier module, by the feature extraction module, and/or by any other suitable module. The built structure class can include: a built structure type (e.g., primary building, such as a primary residence; guest house; pool house; gazebo; apartment; ADU; shed; garage; any other building separate from the primary building; and/or not separate from the primary building, such as an attached garage, attached shed, etc.), water feature class (e.g., pool, lake, ocean, etc.), property feature class (e.g., court, driveway, etc.), vegetation class (e.g., lawn, garden, pasture, trees, forest, etc.), debris class, and/or any other class and/or subclass. The built structure class can be determined based on the georeferenced image, an image feature of the set of image features, and/or any other information. The built structure classes for each image feature can be determined: individually, as a batch (e.g., based on the georeferenced image), serially, in parallel, in response to classification condition satisfaction, and/or otherwise determined. The classification condition can include: multiple buildings on the parcel (e.g., multiple image features within the georeferenced image, multiple buildings listed in parcel data associated with the parcel mask, etc.), image feature generation completion, and/or any other suitable condition.

The built structure class can be based on: parcel information, heuristics, rulesets, zoning, and/or any other suitable information. In a first example, the parcel information can include listing of buildings and associated built structure classes for a given parcel. In a second example, the parcel information can include a listing of building types included on a given parcel.

The assigned built structure classes can optionally be associated with a confidence score for the class (e.g., likelihood, probability score, confidence score, etc.).

In a first variation, S500 can include determining built structure classes for each of the image features, wherein each image feature (or set thereof) is provided as input to the classification module.

In a second variation, S500 can include determining built structure classes for the georeferenced image (e.g., before determining image features in S400).

In a third variation, S500 can include be performed at the same time as S400, wherein the same algorithm is used to identify image features and determine a built structure class for the identified image feature.

However, the one or more built structure classes can be otherwise determined.

Identifying a location of interest within the georeferenced image based on the set of features S600 can function to determine a location of interest in the georeferenced image associated with a physical building and/or other property feature. The location of interest can be: an image feature, a region in the georeferenced image, a geolocation, a set of points in the georeferenced image and/or image feature, a geometric point (e.g., 2D centroid, 3D centroid, barycenter, nadir, apex, etc.), a semantic characteristic (e.g., point associated with an entryway, such as the front door or a back door, point closest to the street, mailbox, porch, etc.), a mask, and/or any other representation. The location of interest is preferably a pixel or set thereof within the image, but can additionally or alternatively be a physical feature depicted within the image, or be otherwise defined. The location of interest can be determined by the selector module, a classification module, and/or by any other suitable module. The location of interest is preferably determined based on the image feature (e.g., within the image feature, within an image segment associated with the image feature), but can additionally or alternatively be determined based on adjacent image features, the parcel data (e.g., parcel boundary, parcel mask, etc.), auxiliary data (e.g., height information), and/or other information. The location of interest can be: within the image feature boundaries, on the image feature boundary, outside of the image feature boundary, within a bounding box surrounding the image feature, and/or otherwise related to the image feature. S600 can be performed after determining image features in the georeferenced image, after identifying built structure classes for the image features and/or the georeferenced image, and/or performed at any other suitable time. S600 can be performed based on the image features, built structure classes, built structure class confidence scores and/or likelihoods, a selection criteria (e.g., specified by the user, pre-specified by the system, etc.), and/or performed based on any other suitable information. The same or different locations of interest types can be determined for different built structure classes, different parcels, and/or other data structures. For example, different points relative to the selected building can be selected as the geolocation based on the building's built structure class. The location of interest type is preferably predetermined, but can be determined by a user (e.g., as part of the geocoding request) or otherwise determined. In a first variant, S600 includes determining a predetermined geometric point of the image feature as the location of interest. The geometric point is preferably a 2D centroid of the image feature, but can additionally or alternatively be a 3D centroid, a barycenter, a nadir, an apex, and/or any other suitable geometric point. The centroid can be determined based on: the boundary of the image feature (e.g., the arithmetic mean position of all boundary points), the geofence of the image feature, the estimated volume of the image feature (e.g., the center of the volume occupied by the structure depicted or represented by the image feature), the geometry of the image feature (e.g., wherein a geometric model of the structure depicted by the image feature can be reconstructed from the image information and analyzed to find the apex, nadir, centroid, and/or other geometric point), and/or based on any other suitable information.

In this variant, the location of interest can be outside of the image features (e.g., for convex buildings, such as buildings having a curved or C-shaped footprint), within the building boundaries, determined based on medial axes, determined based on object skeletons, determined based on the pole of inaccessibility (e.g., largest inscribed circle, point within a polygon that is farthest from an edge), or otherwise determined. In one example, when the centroid is outside of the boundaries of the selected building, alternative geolocation determination methods and/or geolocation definitions can be used (e.g., wherein the geolocation is determined based on medial axes, object skeletons, etc.).

In a second variant, S600 includes determining a semantic characteristic of the image feature. The semantic characteristic preferably identifies a substructure of the built structure (e.g., front door, back door, pool entry, front window, porch, garage door, mailbox, driveway, etc.), but can additionally or alternatively identify a relational point defined relative to a reference, wherein the reference can be a secondary structure (e.g., street, secondary building, etc.), cardinal direction (e.g., north, south, east, west, etc.), and/or other reference; a point associated with a functionality (e.g., access point); and/or be any other suitable characteristic. In this variant, S600 can include applying a semantic module, constructed to identify the semantic characteristic(s), to the image feature. For example, a front door can be identified by a classifier trained to identify front doors, or the northmost point can be identified by orienting the image feature relative to cardinal directions. However, the semantic characteristics can be otherwise determined.

However, the location of interest can be otherwise identified.

S600 is preferably performed for a single image feature within the georeferenced image, but can alternatively be performed for multiple image features within the georeferenced image. In these variants, S600 can include selecting one or more image features from the set of image features having a specific built structure class (e.g., when multiple image features are detected within the image) and/or the highest confidence score (e.g., when multiple image features having the built structure class are identified within the image). The specific built structure class can be: a default class, a user-specified class (e.g., specified in a geocoding request), a class determined based on the location description, and/or otherwise determined. The selection can be performed before or after the location of interest is determined for each image feature. Image features for one or more built structure classes can be selected. For example, a first image feature for a primary building, a second image feature for a secondary building, and a third image feature for a pool can be selected for a given parcel. In a first example, S600 includes selecting the image feature assigned the "primary building" class.

In a second example, when two or more physical buildings are assigned the "primary building" class, S300 includes selecting the image feature assigned "primary building" with the highest confidence score or largest area as the location of interest.

In a third example, S600 includes evaluating the physical buildings using a machine learning algorithm to select the desired image feature. The machine learning algorithm can be specific to the input built structure class, specific a predetermined built structure class, or otherwise selected. The machine learning algorithm can determine the image feature with the desired built structure class (e.g., primary building) based on: the built structure classes, confidence scores, georeferenced image, image features, property data, and/or any other suitable information.

In a fourth example, the image feature can be selected based on a set of rules. Examples of rule sets can include: selecting the image feature with the highest confidence scores for the requested built structure class; selecting the single building on the parcel; selecting the building associated with a predetermined building size (e.g., the largest building or the largest segment, the building size associated with the requested built structure class); selecting the building with a predetermined shape; rule sets selected based on the requested built structure class; or any other suitable rule.

In a fifth example, S600 can filter for image features having a primary building classification, wherein a different instance of S600 is performed for each image feature.

However, the image feature can be otherwise selected.

Determining a geographic identifier associated with the location of interest S700 can function to associate the location of interest with a physical location. The geographic identifier preferably includes a set of geographic coordinates (e.g., latitude and longitude; latitude, longitude, and altitude; grid coordinates; universal transverse Mercator coordinates; universal polar stereographic coordinates; APN; etc.), but can additionally or alternatively include the one or more image features, the one or more built structure classes, built structure data (e.g., built structure polygon, built feature mask, etc.), and/or any other suitable information. The geographic identifier is preferably the geographic coordinates of the physical location (e.g., point, region, etc.) represented by the location of interest, but can be otherwise associated with the location of interest.

In a first variant, the image georeference can be used to determine the geographic coordinates associated with the location of interest identified in S600. In this variant, the location of interest's position within the image (e.g., the location of interest's pixel coordinates) can be transformed into global coordinates using the image's georeference. However, the location of interest's geographic identifier can be otherwise determined.

However, the geographic identifier can be otherwise determined.

Associating the geographic identifier with the location description S800 can function to associate the geographic identifier with the address and/or requested built structure class. Associating the geographic identifier with the location description can include storing the geographic identifier with the location description in the datastore and/or otherwise association technique. The location description is preferably associated with the image feature (and associated geographic identifier) via the parcel information, but can alternatively be associated with the image feature using heuristics (e.g., wherein sequentially incrementing or decrementing addresses are assumed to have a known physical relationship that can be applied to a set of image features); rule sets; estimates; and/or otherwise associated. Information associated with the geographic identifier (e.g., image feature pixel region, image feature geographic region, image feature built structure class and/or subclass, built structure geometries or condition determined from the image feature, etc.) can additionally be stored in association with the location description.

S800 can include: determining the location description for a parcel (e.g., from S100); determining the image features associated with the parcel; and associating the geographic identifier for the image features with the location description.

In a first variation, when the georeferenced image is a parcel image, the geographic identifier (e.g., for the image feature selected in S600) can be associated with the location description for the parcel.

In a second variation, when the georeferenced image is a regional image, S800 can include: retrieving a set of parcel masks, each associated with a location description; determining the image features associated with each parcel by masking the map of image features with the parcel masks; and associating the location description of each parcel with the geographic identifier for the image feature associated with the respective parcel.

However, the geographic identifier can be otherwise associated with the location description.

The method can additionally or alternatively store other geolocations in association with the geographic identifier and/or location description, which can be used for reverse geocoding. The other geolocations can include: the geolocations associated with the entire image feature, the parcel, and/or other image region can be stored in association with the location description and/or geographic identifier. In use, the geographic identifier and/or location description can be returned when a reverse geocoding request identifying a geolocation within the other geolocations is received. However, this information can be otherwise used.

Returning the geographic identifier S900 can function to geocode an address. S900 can be performed in response to receiving a request, wherein the request comprises the location description, and/or performed at any other suitable time.

In a first variant, returning the geographic identifier can include presenting a visual display to the user on a user interface (e.g., images, numerical values, etc.). In a first embodiment, the visual display can include overlaying the identified location of interest and optionally associated image feature on the parcel image and presenting the image to the user. In a second embodiment, the visual display can include overlaying the geographic identifier and the parcel mask on the georeferenced image and presenting the image to the user.

In a second variant, returning the information to the user can include returning a text response (e.g., an API response, such as JSON, CSV, etc.). In variants the text response can include: the geographic identifier determined in S700, information to reconstruct a display as described above, the parcel mask, and/or any other suitable information.

However, the geographic identifier can be otherwise returned.

Returning the location description S1000 can function to reverse geocode the geographic coordinates (e.g., determine an address for the predetermined coordinates). S1000 can be performed in response to receiving a request, wherein the request comprises the location description, and/or performed at any other suitable time.

In a first variant, returning the geographic identifier can include presenting a visual display to the user on a user interface (e.g., images, numerical values, etc.). In a first embodiment, the visual display can include overlaying the identified location of interest and optionally associated image feature on the parcel image and presenting the image to the user. In a second embodiment, the visual display can include overlaying the geographic identifier and the parcel mask on the georeferenced image and presenting the image to the user.

In a second variant, returning the information to the user can include returning a text response (e.g., an API response, such as JSON, CSV, etc.). In variants the text response can include: the location descriptor determined in S700, the geographic identifier, information to reconstruct a display as described above, the parcel mask, and/or any other suitable information.

However, the geographic identifier can be otherwise returned.

Figure 5:
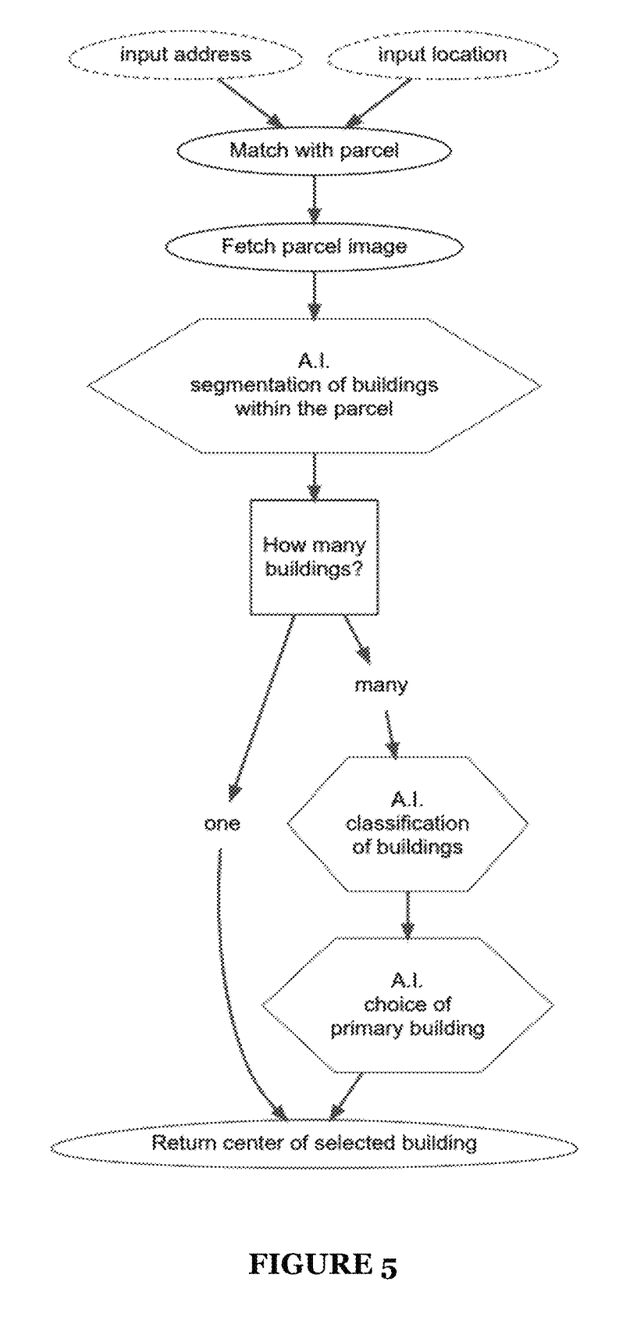
FIGS. 5-7 are examples of the method.

In a first specific example of the method, as depicted in FIG. 5, includes receiving a location description including the input address and/or the input location; matching the location description with a parcel; fetching the parcel via an API request; determining image features within the parcel; determining the number of image features; when the parcel includes image features representative of a single building, returning the center of the building as the geolocation to the user; and when the parcel includes image features representing multiple buildings, determining a built structure class for each building, selecting the building corresponding to the primary building, and returning the center of the selected building as the geographic identifier.

Figure 6:
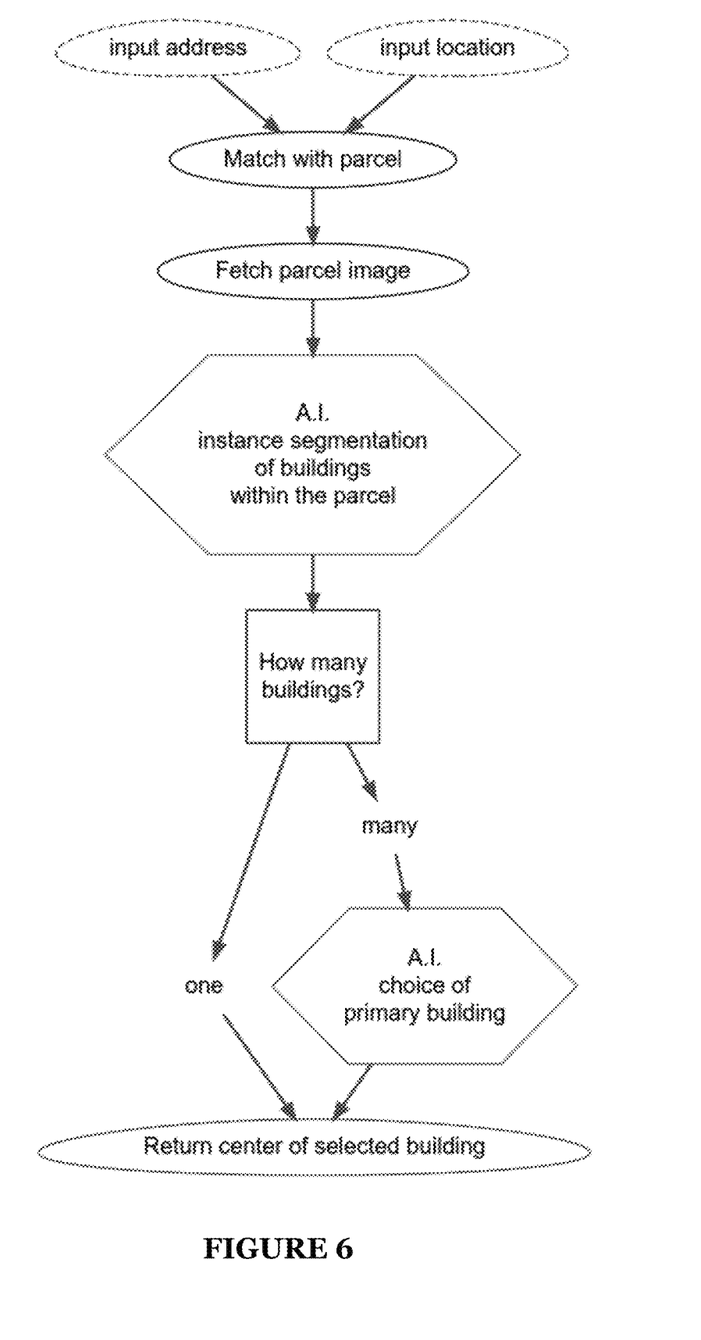

In a second specific example of the method, as depicted in FIG. 6, is similar to the first specific example, but uses a trained neural network to concurrently identify both the image features for each building as well as the respective built structure class (e.g., in a single step), instead of generating image features, classifying the image features, then selecting a building based on the classifications.

Figure 7:
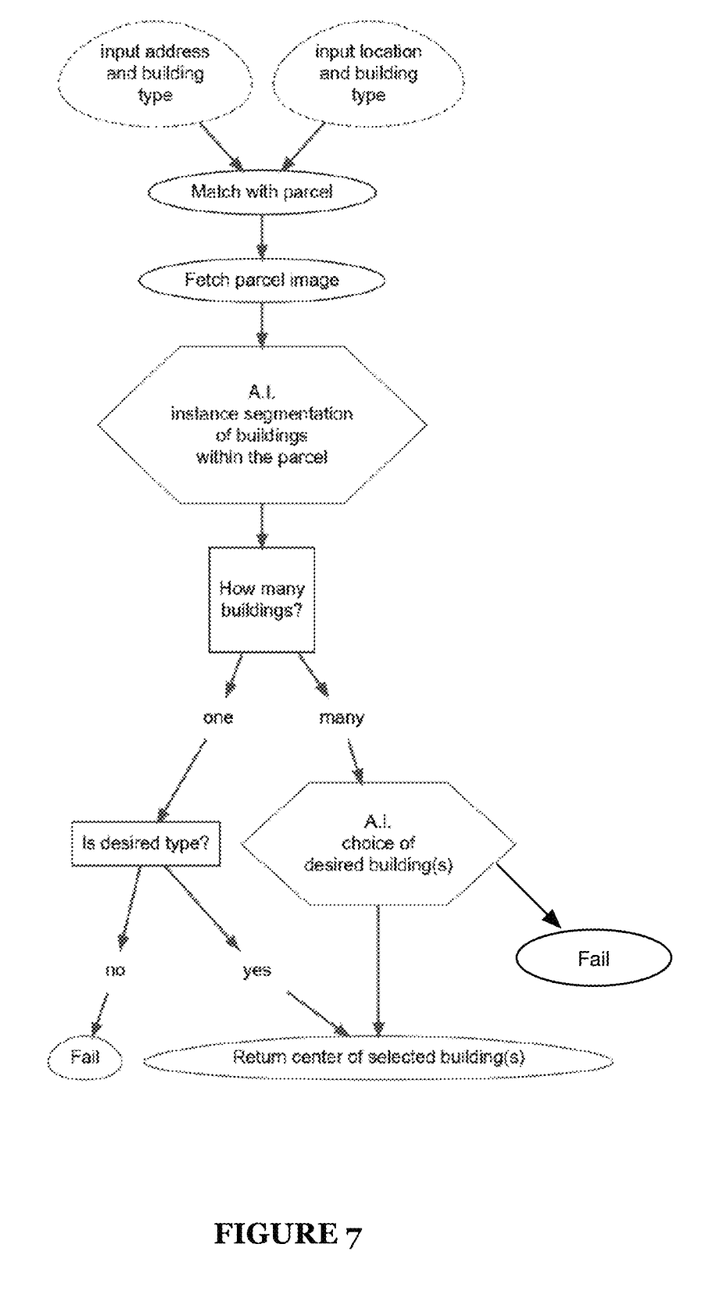

In a third specific example of the method, as depicted in FIG. 7, includes: receiving a location description including the input address, requested built structure class, location, or combination thereof; matching the location description with a parcel; fetching the georeferenced image (e.g., via an API request); determining image features (e.g., of buildings, vegetation, property, etc.) within the georeferenced image; determining the number of buildings based on the image features; when the georeferenced image includes a single image feature, determining whether the image feature is associated with the requested built structure class, failing if the image feature is not associated with the requested built structure class, and returning the centroid of the image feature when the single building is associated with the requested built structure class; and when the georeferenced image includes multiple image features, identifying a location of interest based on the image features, optionally the requested built structure class, and the built structure classes assigned to each image feature; and returning the centroid of the location of interest as the geolocation to the user.

Different processes and/or elements discussed above can be performed and controlled by the same or different entities. In the latter variants, different subsystems can communicate via: APIs (e.g., using API requests and responses, API keys, etc.), requests, and/or other communication channels.

Alternative embodiments implement the above methods and/or processing modules in non-transitory computer-readable media, storing computer-readable instructions that, when executed by a processing system, cause the processing system to perform the method(s) discussed herein. The instructions can be executed by computer-executable components integrated with the computer-readable medium and/or processing system. The computer-readable medium may include any suitable computer readable media such as RAMs, ROMs, flash memory, EEPROMs, optical devices (CD or DVD), hard drives, floppy drives, non-transitory computer readable media, or any suitable device. The computer-executable component can include a computing system and/or processing system (e.g., including one or more collocated or distributed, remote or local processors) connected to the non-transitory computer-readable medium, such as CPUs, GPUs, TPUS, microprocessors, or ASICs, but the instructions can alternatively or additionally be executed by any suitable dedicated hardware device.

Embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

As a person skilled in the art will recognize from the previous detailed description and from the figures and claims, modifications and changes can be made to the preferred embodiments of the technology without departing from the scope of this technology defined in the following claims.

We claim:

1. A method, comprising:
    retrieving a georeferenced parcel image for a property parcel associated with an input address received as part of a request received from a user external the system;
    determining an image segment, depicting a built structure of a predetermined built structure class, from the parcel image, wherein the predetermined built structure class is received as part of the request;
    determining a centroid of the image segment;
    determining geographic coordinates for the centroid based on the parcel image georeferencing; and
    returning the geographic coordinates in response to the request.

2. The method of claim 1, wherein determining the image segment comprises segmenting a set of image segments, associated with the predetermined built structure class, from the parcel image.

3. The method of claim 2, wherein determining the image segment further comprises:
    classifying each image segment from the set with a built structure class; and
    selecting the image segment based on the respective built structure class.

4. The method of claim 1, wherein the request comprises a specified built structure class, wherein the image segment is determined based on the specified built structure class.

5. The method of claim 1, wherein the predetermined built structure class comprises a primary structure.

6. A method for determining geographic information, comprising:
    determining a georeferenced image depicting a property parcel associated with a location description received as part of a request received from a user external the system;
    determining an image feature, associated with a built structure class, from the image;
    identifying a location of interest within the image based on the image feature;
    determining a geographic identifier associated with the location of interest based on the image georeference; and
    associating the geographic identifier with the location description, wherein the geographic identifier is returned in response to the request.

7. The method of claim 6, wherein the location of interest comprises a geometric centroid of the image feature.

8. The method of claim 6, wherein the image comprises depth information.

9. The method of claim 6, wherein the location description comprises an address, and wherein the geographic identifier comprises geographic coordinates.

10. The method of claim 6, wherein the geographic identifier is received as part of a request; and wherein the geographic information is returned in response to the request.

11. The method of claim 10, wherein the request comprises a requested built structure class, wherein the built structure class is the requested built structure class.

12. The method of claim 6, wherein the image feature comprises an image segment.

13. The method of claim 12, wherein the image segment is determined using a segmentation algorithm that receives the image as input.

14. The method of claim 13, wherein the segmentation algorithm comprises a building classifier, wherein the building classifier determines the building classification for the image feature.

15. The method of claim 13, wherein the segmentation algorithm is a trained neural network.

16. The method of claim 6, wherein the image segment is determined using a trained semantic segmentation model.

17. The method of claim 16, wherein the trained semantic segmentation model segments a set of image segments from the image, the method further comprising:

classifying each image segment of the set with a building type; and selecting the image segment from the set based on the building type.

18. The method of claim 6, wherein the georeferenced image is derived from a regional image and a parcel boundary for the property parcel.

19. The method of claim 18, wherein the regional image is an aerial image.

20. The method of claim 18, wherein the parcel boundary is retrieved from a third-party database.

* * * * *